US007366692B2

(12) United States Patent
Alcaly et al.

(10) Patent No.: US 7,366,692 B2
(45) Date of Patent: Apr. 29, 2008

(54) METHOD AND SYSTEM FOR GENERATING AN INDEX OF INVESTMENT RETURNS

(75) Inventors: Roger Alcaly, New York, NY (US); Timothey J. Rudderow, New Hope, PA (US); Frank L. Vannerson, Princeton, NJ (US)

(73) Assignee: Mount Lucas Management Corp., Princeton, NJ (US)

( * ) Notice: Subject to any disclaimer, the term of this patent is extended or adjusted under 35 U.S.C. 154(b) by 705 days.

(21) Appl. No.: 09/852,222

(22) Filed: May 9, 2001

(65) Prior Publication Data

US 2002/0007329 A1 Jan. 17, 2002

Related U.S. Application Data

(60) Provisional application No. 60/202,790, filed on May 9, 2000.

(51) Int. Cl.
*G06Q 40/00* (2006.01)
(52) U.S. Cl. ......................... 705/37; 705/35; 705/36 R; 705/38; 705/1; 705/4
(58) Field of Classification Search ................. 705/37, 705/36 R, 38, 1, 4
See application file for complete search history.

(56) References Cited

U.S. PATENT DOCUMENTS

| | | | |
|---|---|---|---|
| 5,126,936 A | | 6/1992 | Champion et al. ........... 364/408 |
| 5,784,696 A | | 7/1998 | Melnikoff ..................... 705/36 |
| 6,061,663 A | * | 5/2000 | Bloom et al. .............. 705/36 R |
| 6,321,212 B1 | * | 11/2001 | Lange ....................... 705/36 R |
| 6,564,192 B1 | * | 5/2003 | Kinney et al. ................. 705/37 |
| 6,622,129 B1 | * | 9/2003 | Whitworth .................... 705/37 |
| 6,754,639 B2 | * | 6/2004 | Ginsberg ................... 705/36 R |
| 6,922,677 B1 | * | 7/2005 | Sperandeo ................. 705/36 R |
| 7,062,459 B1 | * | 6/2006 | Herbst et al. .................. 705/37 |
| 7,099,838 B1 | * | 8/2006 | Gastineau et al. ............. 705/35 |

FOREIGN PATENT DOCUMENTS

WO    WO 9722075    *    6/1997

OTHER PUBLICATIONS

Greg Horn, "Alternative Investments: Managed Futures As A Portfolio Driver", Trusts & Estates, Nov. 1998, pp. 1-3, PRIMEDIA Intertec, Atlanta, GA.
Charles R. Lightner, "A Rationale For Managed Futures", Technical Analysis of Stocks & Commodities, 1999, pp. 1-6, Technical Analysis, Inc.

(Continued)

*Primary Examiner*—James Trammell
*Assistant Examiner*—Daniel Felten
(74) *Attorney, Agent, or Firm*—Darby & Darby P.C.

(57) ABSTRACT

A method and system for generating returns for investments in asset classes such as bonds, currencies, and commodities. The index of these returns may be used as a benchmark to measure the investment performance of one or more of the asset classes that make up the index. It may also be replicated in the markets in which futures contracts for members of these asset classes are traded and used to earn the returns that the index measures. Indices constructed for each asset class can be combined with each other and with equity indices to create tradable indices hedge fund returns.

23 Claims, 3 Drawing Sheets

OTHER PUBLICATIONS

Randy Warsager and Kelley Ritchey, "Institutions make their move", Futures, Jun. 1999, pp. 1-4, Futures Communications Company, Chicago, IL.

Nicholas Chan et al., "Systemic Risk and Hedge Funds", NBER Conference on the Risks of Financial Institutions, Aug. 1, 2005, pp. 1-91.

Harry M. Kat and Helder P. Palaro, "Superstars Or Average Joes? A Replication-Based Performance Evaluation Of 1917 Individual Hedge Funds", Alternative Investment Research Centre, Cass Business School, City University, Feb. 6, 2006, Working Paper #0030, pp. 1-31, London, UK.

Harry M. Kat and Helder P. Palaro, "Replicating Hedge Fund Returns Using Futures—A European Perspective", Alternative Investment Research Centre, Cass Business School, City University, Mar. 24, 2006, Working Paper #0032, pp. 1-34, London, UK.

William Fung and David A. Hsieh, "Hedge Fund Benchmarks: A Risk Based Approach", Fuqua School of Business, Duke University, Mar. 2004, pp. 1-49, Durham, NC.

Sharpe, W.F. "Asset Allocation: Management Style and Performance Measurement"; *Journal of Portfolio Management*, vol. 18, No. 2, Winter 1992, pp. 7-13.

Gibson, R.C., "The Rewards of Multiple-Asset-Class Investing"; *Journal of Financial Planning*, vol. 12, No. 3, Mar. 1999, Conclusion.

* cited by examiner

METHOD AND SYSTEM FOR GENERATING AN INDEX OF INVESTMENT RETURNS

This application claims priority from U.S. Provisional application Ser. No. 60/202,790 Filed May 9, 2000 which is hereby incorporated herein by reference.

FIELD OF THE INVENTION

The invention relates to a method for measuring and earning the fundamental returns to investing in asset classes including non-equity asset classes.

BACKGROUND OF THE INVENTION

More than one hundred billion dollars (US) is currently invested in hedge funds, private investment funds with broad mandates and powers, including the ability to use leverage, take short positions and charge performance-related fees. The popularity of such funds is driven in part by their investment flexibility and by a desire for diversification on the part of investors. As a group, hedge funds invest in a wide variety of asset classes, including world equity (stock) markets and commercial (non-equity) asset classes such as global bonds, currencies and commodities. (An asset class is simply a set of similar assets such as stocks, bonds, currencies, and commodities, including all securities or contracts based on the assets such as futures and forward contracts.) While investment strategies used in equity markets overwhelmingly involve buying individual stocks or groups of stocks, the investment strategies used in these other asset classes are said to be "opportunistic" in the sense that positions are much more likely to vary over time in both size and direction. For example, the funds may have long bond positions when interest rates are expected to decline, and short bond positions when interest rates are expected to rise. (A long position refers to a purchase, or agreement to purchase, a particular asset, while a short position refers to a sale or agreement to sell.) Since the returns from investing in bonds, currencies and commodities tend to be uncorrelated with equity returns, the varied nature of hedge funds' investment profile has great appeal for investors in search of diversification beyond traditional assets.

A major obstacle to further growth in hedge fund investments, particularly for institutions, is the lack of performance benchmarks. Unlike equity funds, for example, where a number of equity indices are available for use in evaluating performance, hedge funds operate in a benchmark vacuum. Ironically, it is the same asset categories that are the source of so much diversification that pose the difficulties to developing a valid benchmark. The common view in financial circles is that the dynamic nature of bond, currency and commodity investments (sometimes long, sometimes short) present difficulties for indices that are insurmountable.

Nobel Laureate William F. Sharpe proposed in a 1992 article, *Asset Allocation: Management Style and Performance Measurement* (Journal of Portfolio Management, Winter 1992), that the returns of mutual funds could be explained by a linear combination of a small number of factors. Sharpe was concerned with mutual funds that invested in traditional asset classes, namely, stocks and bonds, and did not use leverage or take short positions. The explanatory factors he uncovered were the traditional investment benchmarks such as the S&P 500, or indices of small capitalization stocks or growth stocks. Critically, each of these benchmarks is based on market prices of the securities included in the benchmark.

Sharpe's article was the genesis of "style analysis," the attempt to categorize and better evaluate the performance of different investment managers. Other authors have attempted to extend style analysis beyond managers who invest in equities to those who invest in asset classes such as global bonds, currencies, and commodities, an area commonly known as "alternative investments." This is the domain of hedge funds and commodity trading advisors (CTAs).

Application of Sharpe's method to alternative investment managers is hampered by the nature of the investment activity. Hedge fund managers and CTA's typically take both long and short positions in the markets in which they trade, so direct application of buy and hold benchmarks cannot capture their investment returns. As a consequence, attempts to benchmark the performance of hedge fund managers and CTA's have tended to degenerate into indices that combine the investment returns of similar managers, called "manager benchmarks." These indices simply bypass the requirement that a useful benchmark be based directly on market prices.

There is a need for a system that provides benchmarks based on market prices for asset classes other than equity. The present invention satisfies this and other needs.

SUMMARY OF THE INVENTION

The present invention is a method and system for generating a series of returns to investing in asset classes such as bonds, currencies and commodities. Unlike equities, the intrinsic, or fundamental, returns to investing in these categories of assets can only be captured by investment strategies that take short positions as well as long positions at appropriate times. We call such asset classes "commercial," and the markets in which particular members of these classes trade, "commercial markets." Almost all markets except equity (stock) markets are commercial in this sense.

The reason that capturing the intrinsic returns to investing in commercial markets requires investment strategies that can be short as well as long is that the participants in commercial markets include natural "hedgers." These participants use these markets to hedge, or partially offset, risks that arise in the normal course of their business. For example, wheat producers risk the possibility that market prices for wheat will be lower when their wheat is harvested, but can use short positions in wheat futures to offset this risk to greater or lesser extent. Bakers, on the other hand, risk the possibility that flour prices will rise in the future, and can offset this risk through long positions in wheat futures. Investors earn returns from investing in wheat futures because they bear the risks that these important commercial interests want to reduce, and earning these returns requires that investors have both long and short positions at different times.

Upon selection of the commercial asset classes to which it is to be applied, in accordance with the present invention an index for investment returns may be generated having at least two primary features. First, the index may be used as a benchmark to measure the performance of the asset class comprising the index. The benchmark indicates the intrinsic returns to investing in any reasonably representative group of assets in that class. Second, the index may be replicated in the markets in which these assets are traded. Such a tradable index can be used to earn the fundamental returns that the index measures. It thus can form the basis of an index-based investment fund, or index fund Indices generated by application of the present invention are not limited to homogeneous collections of assets. In contrast to most indices currently used by investors that focus on assets of a particular nature (for example, stock market indices include only stocks, commodities indices include only commodities), indices generated with the present invention may combine many different classes of assets. Indices constructed for each of these asset classes can be combined not only with each other but the individual indices, or any group of them, can also be combined with existing equity indices. For example, currencies, commodities, and bonds are three asset classes that may be represented in a single index by combining indices constructed for each of these asset classes. The resulting index can be combined with an index generated in the future markets for equities, e.g., a futures index for the S&P 500, to produce a composite index representing the returns of all of the major assets classes.

In accordance with the preferred embodiment of the present invention, an index for any commercial asset class can be generated from market prices for futures and forward contracts for representative members of the class. First, representative assets and futures contracts on these assets are selected for each of the asset classes. In case of currencies, for example, consider the British Pound, Japanese Yen, Swiss Franc, Australian Dollar, Canadian Dollar, and Euro (all expressed relative to the US Dollar), and the futures contracts for these currencies that are traded on the IMM division of the Chicago Mercantile Exchange, with deliveries in March, June, September and December.

Second, calculate indices for each commercial asset class, hence a global currency index, a global bond index, and a commodity index. Each of these indices may be calculated by applying the algorithms described below to the market prices of representative futures contracts for each asset class. For example, the MLM Index™ algorithm (described below) may be used, except that a separate index is created for each commercial asset class.

Finally, the indices for the different commercial asset classes can be combined with each other and/or with existing stock market indices such as the S&P 500. In combining indices, a weight is assigned to each component index where, for example, the weight represents the proportion of each dollar invested in the overall index to be allocated to each component index. The resulting index return is the weighted average of the returns of each component index. There are an infinite number of weighting combinations that can be determined in a variety of ways. Moreover, the weights do not have to add to one. In fact, if the sum of the weights exceed one, it means that the portfolio employs leverage, and the extent to which the sum of the weights exceeds one determines the degree of leverage.

The present invention has broad applicability. One of its broadest applications is a tradable index (or performance benchmark) of hedge fund returns. Hedge funds have been characterized as investment funds that make leveraged bets on anticipated price movements of stock markets, interest rates, foreign exchange, and physical commodities. For example the MLM GMS™, an index embodying the present invention, combines in a particular way individual indices for global bonds, global currencies, and commodities with the major stock market indices, e.g., S&P 500 (Standard and Poors 500 stock index, US), CAC 40 (Compagnie des Agents de Change-40, France), DAX (deutsche Aktienindex, Germany), FTSE-100 (Financial Times Stock Exchange 100 stock index, UK), Nikkei 225 (Nihon Keizai Shimbun, Japan). The returns of this tradeable index closely track the returns of hedge funds generally and "global macro" hedge funds in particular.

BRIEF DESCRIPTION OF THE DRAWINGS

The attached figures show schematically how indices can be constructed for any asset class or for combinations of different asset classes using the present invention.

DETAILED DESCRIPTION OF THE PREFERRED EMBODIMENT

Figure 1:
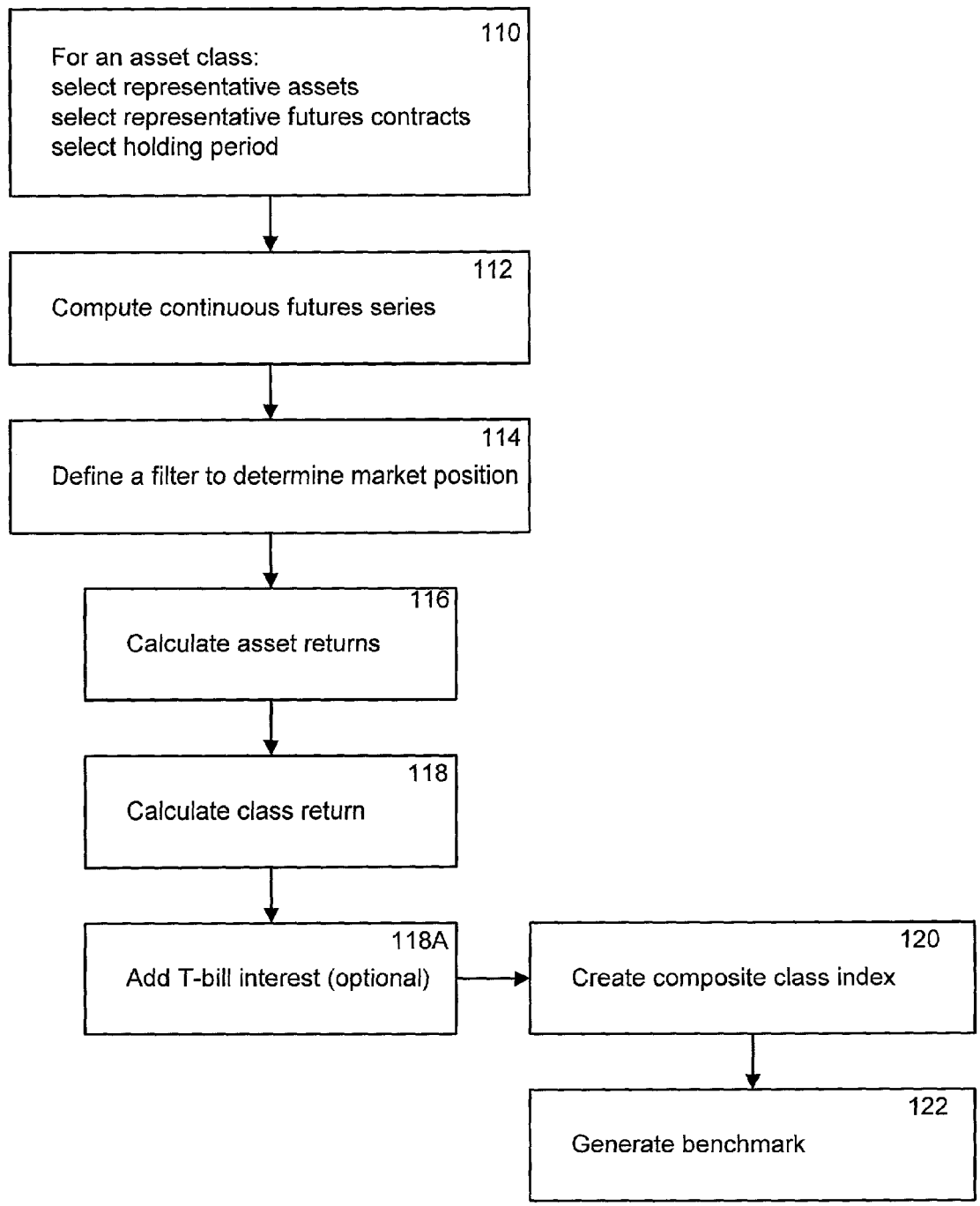
FIG. 1 is a flow chart showing the method of generating an index for any asset class according to the preferred embodiment of the present invention.

In the preferred embodiment of the present invention, an index may be generated from market prices for futures and forward contracts for a representative sample of assets in any commercial asset class. The index may be used as a benchmark for evaluating the performance of investment managers who invest in these asset classes. For example, the index may be used for style analysis of hedge funds and commodity trading advisors. The index may also be replicated directly in the futures and forward markets from which it is derived so that investors in the index can earn the measured return.

The preferred embodiment of the present invention expands and improves the methodology used in the MLM Index™ (described below) to apply it to commercial asset classes individually and in various combinations. These applications enable the development of tradeable benchmarks for investments in any group of these commercial asset classes and, in combination with equity benchmarks, for the investment performance of hedge funds as a group (and for particular hedge fund categories, especially "global macro" hedge funds). In constructing these indices, the preferred embodiment of the present invention may also use indices other than the newly developed ones described herein to capture the returns in some or all of the commercial asset classes, just as it uses existing indices for equity markets. However, in order to be useful in practicing the present invention a commercial market index must adequately allow for both long and short investments in these markets and must be capable of being replicated in these markets in real time. Examples of "real time" indices include the S&P 500, Nikkei, the Shearson Lehman bond index, and the Morgan Stanley Europe Asia Far East (EAFE). On the other hand indices that are not available in real time (i.e. those computed days or weeks after the events on which such computations are based) include the Credit Suisse First Boston/Tremont hedge fund index (CSFB/Tremont) and the Zurich Trading Advisor index.

The indices that are derived from the preferred embodiment of the present invention have all of the characteristics and uses of any financial performance benchmark. They are based on exact mathematical calculations that can be easily reproduced and verified. The calculations can be used to compare and evaluate the performance of any investment managers who invest in these markets including hedge fund managers and CTA's. Since these funds charge investors a performance fee, the benchmarks can also be used to define appropriate "hurdle rates" on which to base such fees. For example, investors might insist on paying performance fees only to the extent that the manager's performance beats that of the index. Finally, for investors who prefer to invest directly in benchmarks rather than in actively managed funds, these benchmarks can be efficiently traded, i.e., replicated in the markets from which they were derived with negligible tracking error, and included in a portfolio.

The index methodology derives from two critical observations and concepts: (1) that in order to capture the intrinsic returns to investing in most asset classes other than equities, a benchmark must reflect the returns from short as well as long positions at different times (as opposed to equity markets in which the fundamental returns come from being long only); and (2) that these returns can be measured, and replicated, from market prices for futures and forward contracts for a representative sample of assets in any commercial asset class. These fundamental concepts are embodied in the algorithms presented herein. The algorithms enable one to construct indices for any commercial asset class, or for any combination of commercial asset classes and existing stock market indices.

As shown in FIG. 1, there are several aspects to the process incorporated in the algorithms, including: (step 110) selecting representative assets for an asset class and representative markets, futures contracts, and holding periods for these assets; (step 112) constructing from the different futures contracts for each asset class member a continuous futures series for the asset to which a long/short decision rule can be applied in real time; (steps 114-116) specifying a decision rule and constructing returns for the representative assets from application of the decision rule to the relevant contracts; (steps 118-120) combining individual asset returns to create asset class indices, and (step 122) combining asset class indices to create "larger" indices such as an index for global bonds and currencies, or, together with stock market indices, for hedge funds. A continuous futures series is used because futures (and forward) contracts expire periodically creating discontinuities in their price series.

The prior art MLM Index™ has been in commercial use for more than 10 years, and has an established reputation in the market as a benchmark of the returns available to futures investors. The MLM Index™ has been accepted by the Department of Labor as a benchmark for the payment of incentive or performance fees for institutional futures investments. The MLM Index™ is based on a portfolio of assets whose futures contracts are among the most active futures contracts traded on U.S. futures exchanges. (The group of futures contracts for the different assets are sometimes called the futures "market" for that asset; thus the futures contracts for soybeans might be called the soybean futures market.) The monthly rate of return of the index equals the simple average of the monthly rates of return of the markets in the Index plus the T-bill rate. This index reflects long and short positions but, unlike the preferred embodiment, it combines returns from different asset classes.

The existing MLM Index™ is based on futures markets for 25 assets, namely, 6 currencies, 3 interest rates and 16 physical commodities. For each market, specific representative futures contracts are specified and the return calculated from positions based on the 12 month moving average of a constructed continuous futures series. For example, to calculate the return for soybeans market, the following steps would be executed:

1. Select four representative soybean futures contracts, for example, the March, May, July, and November contracts, and calculate a continuous futures series (CF) for these contracts.
2. Apply the 12-month moving average filter to determine the position. If the current value of the CF is above the average CF, then establish a long position for the subsequent month; otherwise take a short position.
3. Determine the return for the next holding period by calculating the percentage price change, and applying the position direction. For example, if the soybean price increases by 10% and the position determined at the end of the previous period was short, then the return would be minus 10% (−10%).
4. Calculate the return for all 25 assets in the Index, following the same steps 1-3.
5. The return for the MLM Index™ then is the average, for each holding period, of the returns of the individual markets plus the current T-bill rate.

The MLM Index™ makes no distinction between the related assets in the index. It is a composite of the returns for 25 assets whose futures contacts are traded in liquid futures markets on U.S. futures exchanges. As such, it combines in one index the returns from different asset classes. It also is limited to the particular equal weighting employed in its design. Therefore, it has limited use in style analysis of hedge funds.

As a preface to the full details of the algorithms used in the preferred embodiment, the following is a list of terms used in the algorithms along with definitions and abbreviations for the terms.

Asset class (C)—An asset class is a set or group of similar assets such as bonds, stocks (equities), currencies, or commodities, including the securities or contracts based on them. Specific members (m) of these asset classes, and the related securities and contracts (financial instruments), trade in markets.

Continuous futures series (CF)—A continuous series calculated for a predefined chronological list of futures contracts for a particular asset class member. In order to calculate the investment returns for these asset class members from their futures contracts, a continuous series must be created. In futures markets, returns cannot be computed directly from actual market prices of futures contracts because those contracts expire periodically creating large discontinuities in the actual prices. Therefore in order to establish a basis for deciding the next position, it is necessary to create a continuous series of returns that could be earned by investing in a sequence of actual futures contracts. For example, a March futures contract is purchased in January for price $5; in March the contract is sold for $6 and a June contract is purchased at price $8; there is discontinuity in the price at which the March contract is sold and the June contact is purchased. Using actual prices from a sequence of contracts would misrepresent investment results. Instead, a continuous series is created by applying, to an arbitrary starting value, the returns from holding individual contacts. This analogous to adjusting stock prices for a stock split.

Contract (k)—Specific futures contract used in an index calculation. For any member of an asset class (m), contract k is a specific futures contract, traded on a specific exchange for delivery on a specific date. Futures contracts are the preferred instrument to gauge the returns for the preferred embodiment because they are exchange traded and allow for variable leverage.

Filter (FL)—A mathematical rule or algorithm used to determine long or short positions for any member in any holding period.

Holding period (h)—The period of position evaluation. For example, if the holding period is a calendar month, a position would be held for one month and reevaluated at the end of the month to determine the position for the subsequent month.

Market—The market, or group of markets, in which securities or contracts for particular members (m) of an asset class are traded. For example, if the asset class is currencies, a member may be the Japanese Yen, and the corresponding market the futures market for the Japanese Yen (expressed relative to the U.S. dollar)

Market Position—see position.

Market Price—the price of a specific exchange traded futures contract at a specific point in time. See PR(h,k,m) and PL(h,k,m).

MLMI (h,C)—A composite index of an asset class C for holding period h.

N—The number of members within an asset class.

PL(h,k,m)—The market price for futures contract k for asset class member m on the last day of holding period h.

Position (PO)—Position is a variable which indicates whether a particular member of an asset class is long or short (bought or sold), taking the values 1 and −1 respectively. The position is determined by the application of the filter (FL) to the continuous futures series (CF) for that member.

PR(h,k,m)—The market price for futures contract k for asset class member m on the next to last day of the holding period h.

Return (R)—The percentage change in the price or value of a specific futures contract, group of contracts, or index over a holding period.

R(h, m)—The return for asset class member m during holding period h. It is calculated as the percentage change in the market price of a specific futures contract for that member.

R(h,C)—The return of asset class C over holding period h. It is the average of the returns for the chosen representative members of the class.

R(h,I)—The return of index I during holding period h. It is a weighted average of the returns for the asset classes in the index. The weights are determined separately for different indices.

Figure 3:
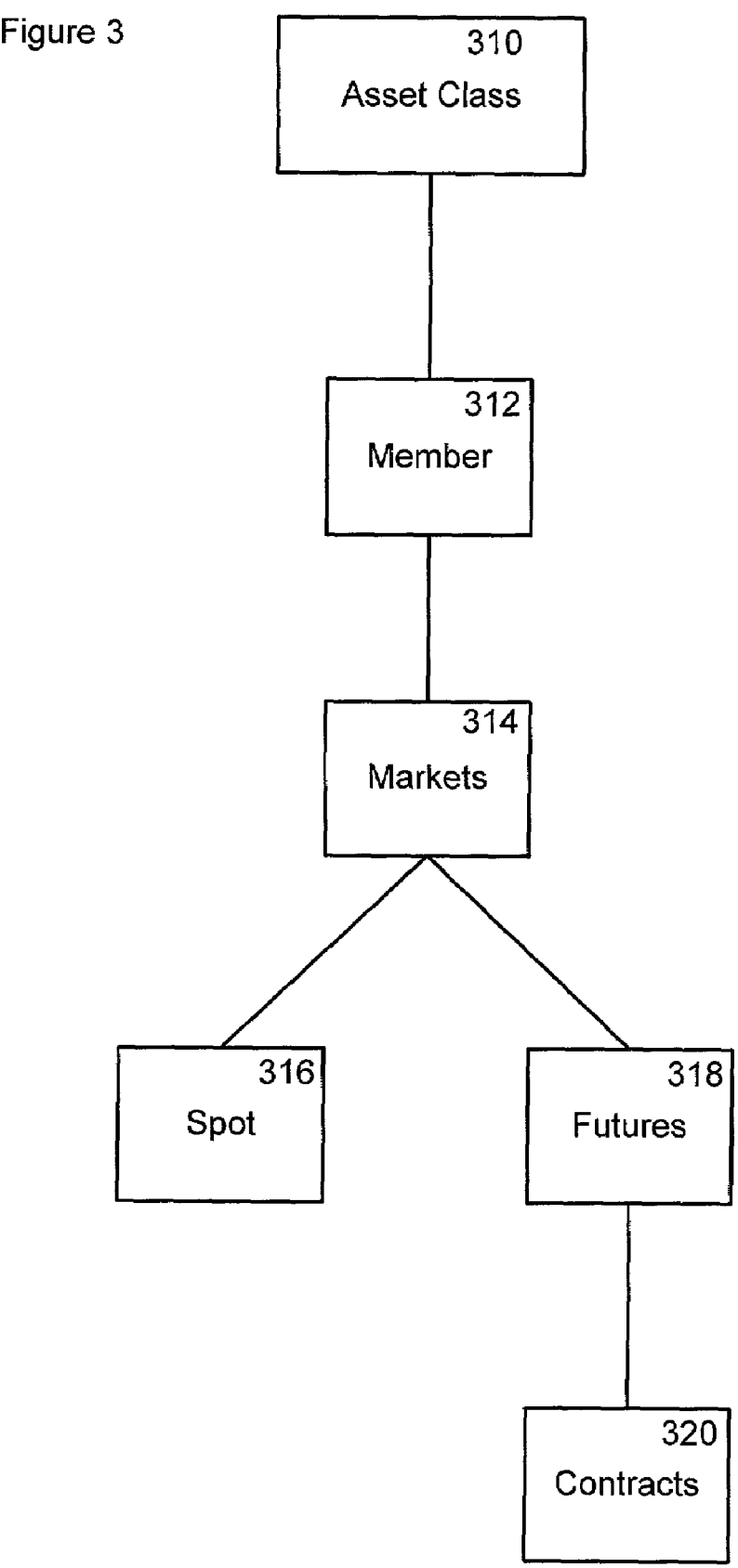
FIG. 3 is block diagram showing the relationship among various terms employed.

Referring to FIG. 3, the members 312 of an asset class 310 are the selection of assets of a uniform type. Each member 312 is a particular asset. The securities and contracts based on that asset are tradable in a corresponding market 314. A market 314 may be spot 316 or futures 318. With respect to the futures market 318, trading is performed by way of futures contracts 320.

I. Index Construction for Any Asset Class

Referring to FIG. 1, an index for each class may be constructed by the following steps:

Step 110—selecting the representative members of the asset class, the particular contracts for each of these members, and the holding period. For any commercial asset class C, define the following parameters and variables:

a. The members to be included and the period for selection; typically the members are selected annually, on the basis of liquidity of the futures markets in which they are traded.

b. The futures or forward contracts to be used within each market are selected periodically, generally annually. Typically these will be the four most liquid futures contracts.

c. The holding period or length of time a position will be held. This parameter is determined separately for each asset class; it is generally a month.

d. The contracts used in each holding period; generally the nearest contract among those selected in step b. above which is not deliverable (i.e., does not expire) in the subsequent holding period.

Step 112—Computing a continuous futures series. For each member, m, construct a continuous futures series as follows: For each holding period h, let PR(h,k,m) be the market price of futures contract k on the next to last day of holding period h. For example, if k=June, m=Japanese Yen and h=the calendar month ending Mar. 31, 2000, then PR is the market price of the June Japanese Yen contract on the next to the last business day of the month, e.g. Mar. 30, 2000. The continuous futures series, CF, for member m in holding period h is then defined by:

$$CF(h,m)=CF(h-1,m)*(PR(h,k,m)/PR(h-1,k,m)) \qquad (1)$$

where CF(0,m) is set at an arbitrary beginning value, normally 1000.

CF solves the price discontinuity problem common to all futures markets that occurs when one futures contract expires and a subsequent contract continues trading at a different price. For example, a March Japanese Yen contract expires in March and a subsequent contract, say the June Japanese Yen contract, continues trading at a different price. Using the price on the next to the last business day of the holding period (e.g., month) in the computation of CF allows the index to be replicated in the markets in real time since the position is determined using data that are available before the price for last day is established.

Step 114—Defining a filter to determine the market position. Using the CF series for all holding periods up to and including h as the only input, define a mathematical filter, FL, with only two possible outcomes, plus or minus. The outcome computed in holding period h will determine the market position, PO, for the next holding period, h+1. Thus, if $$FL(CF(0,m) \ldots CF(h,m)) \text{ is positive, then } PO(h+1,m)=1$$

$$\text{Otherwise } PO(h+1,m)=-1. \qquad (2)$$

The purpose of the Filter is to provide a rule for determining price trends, both up and down, in the market under consideration. There are, of course, many such rules, but a simple filter could be based on a moving average. For example, assuming the holding period is one calendar month, such a filter may be described as follow: if the current value of CF is above the 12 month moving average of the CF series, then the market position should be long for the following holding period, otherwise the position would be short. Other possible filters could use different moving average lengths, different ways to determine whether a position should be long or short (e.g., it should be long only if the current value of CF is above the current value of the 12 month moving average by 10% or more), or completely different mechanisms such as the monthly changes in CF, or "runs" in the direction of these monthly changes.

Step 116—Calculating the market return (R) of the asset class member (m) in the holding period (h+1), denoted R(h+1,m).

$$R(h+1,m)=((PL(h+1,k,m)/PL(h,k,m))-1)*PO(h+1,m) \quad (3)$$

where PL(h,k,m) is the price of futures contract k of market m on the last business day of holding period h.

Step 118—Calculating the class return. Assume that commercial asset class, C, can be represented by N members. Then the return for C is the average of the holding period returns for each member in class C:

$$R(h+1,C)=\text{Sum}(R(h+1,m))/N \text{ for all } m \text{ in } C. \quad (4)$$

Calculating the class return in this fashion assumes equal weighting of the members of the asset class, with rebalancing occurring at the beginning of each holding period (i.e., each member begins each new period with the same value regardless of whether one had grown more rapidly than another in the prior period).

Step 118A—(Optional) Adding interest income. Since the return for any asset class C is calculated from the returns on representative futures contracts for representative members of the class, and since futures market investors earn interest on their equity balances, it may be appropriate to add T-bill interest to the asset class return calculated in equation (4) as is done in the MLM Index™. Thus, the index for asset class C can be constructed to include interest income but need not be so constructed.

Step 120—Creating a composite Index for asset class C in holding period h+1, defined as MLMI(h+1,C) and determined by:

$$MLMI(h+1,C)=MLMI(h,C)*(1+R(h+1,C)) \quad (5)$$

where MLMI(0,C)=1000.

II. A Specific Example: Constructing a Currency Index

Step 110—Set the following variables for the currency asset class:
  a. The members to be included are the British Pound, the Japanese Yen, the Swiss Franc, the Australian Dollar, the Canadian Dollar, and the Euro.
  b. For each member, the futures contracts traded on the IMM division of the Chicago Mercantile Exchange, with deliveries in March, June, September and December will be used to construct the Index
  c. The holding period will be one calendar month.
  d. The contract whose expiration month (also called the delivery month) follows most closely the holding period month will be used. In the currency markets, the contracts begin expiring in the first week of the delivery month, so, the March contract will be used in the February holding period, the June contract will be used in the March holding period, and so on.

Step 112—For each asset class member and its representative futures contracts, construct a continuous futures series. Table I below demonstrates the calculation procedure for one member of the currency class, the Japanese Yen (JY). CF(h,JY) is calculated according to equation (1) above, with CF(0,JY)=1000.

Step 114—Using CF for all holding periods up to h as the only input, define a filter FL that determines a position, PO, for the next holding period as in equation (2) above. For this specific case, consider the function MA, the average of the most recent last 12 values of CF(h,JY):

$$MA(h,JY)=\text{Sum}(CF(h,JY) \ldots CF(h-11,JY))/12.$$

Further, let the filter FL be described as follows:

$$FL(CF(0,JY) \ldots CF(h,JY))=CF(h,JY)-MA(h,JY). \quad (6)$$

Then,

If $CF(h,JY)-MA(h,JY)$ is positive then $PO(h+1,JY)=1$ otherwise $PO(h+1,JY)=-1$.

Table II shows the results of applying this filter to the Japanese Yen.

Step 116—Now that the market position has been determined, calculate the return R(h,JY) for the Japanese Yen in each holding period h from equation (3) above. Specifically, $$R(h+1,JY)=((PL(h+1,k,JY)/PL(h,k,JY))-1)*PO(h+1,JY).$$

Table III illustrates the calculation for the entire period used in this example.

Note that the position PO for any period is determined at the beginning of that period using data covering all periods through the end of the prior one. For example, the position to be held in the March holding period is determined using market prices up to the next to last business day of February. Thus, the return calculation does not use any data that are not observable before the calculation takes place. As a result, the Index returns can be replicated in real time.

Step 118—In the same manner, returns can be calculated for all members of a commercial asset class. Table IV (columns 2-8) provides the returns for all the specified representative members of the currency class according to equation (3). The return of the class, calculated according to equation (4), is the average of the returns of each representative member for each holding period, and is provided in column 9. Such a calculation implies an equal weighting in the Class for each member.

Step 120—The Index for the Currency class MLMI(h,C) follows from inserting the series of class returns in equation (5) in order, after establishing an arbitrary starting value of 1000. This calculation is also shown in Table IV columns 9-10.

Following the same straightforward procedures, class returns and indices can be created for any commercial asset class, such as commodities or bonds.

III. Benchmarking Hedge Funds

Hedge funds are private investment funds, generally structured as limited partnerships or limited liability companies, which can use leverage and charge performance-related fees to the investors. The funds can only be offered to qualified investors. Their intended investment activities are enumerated in the offering documents and range from traditional investments such as stocks or bonds to various types of arbitrage such as merger arbitrage or yield curve arbitrage. The funds are often categorized according to their area of specialization. For example, "technology" funds specialize in investments in technology companies while "global macro" hedge funds are hedge funds whose range of potential investments is virtually unlimited.

Given these definitions, particularly the range of markets employed and the use of leverage, it is not surprising that attempts to benchmark this type of investing have been unsatisfactory. Other indices have floundered on their inability to capture the returns of the commercial asset classes included in these funds' portfolios. The methodology of the preferred embodiment provides a broad solution to this problem.

Following the methodology, a benchmark for hedge funds can be calculated by applying the procedures described above to the individual asset classes in which these funds invest, and combining the asset class indices using appropriate weights. Thus, the returns of hedge funds in holding period h can be defined as $$R(h,I)=R(h,C(1))*W(C(1))+R(h,C(2))*W(C(2))+ \ldots +R(h,C(J))*W(C(J)) \quad (7)$$

where R(h,C(j)) is the return of asset class C(j) in holding period h,

W(C(j)) is the weight assigned to that asset class, and

J is the number of asset classes considered.

The asset classes can include classes such as equities, which can be represented by the standard existing benchmarks, or commercial asset classes, represented by the benchmarks created according to the preferred embodiment.

The weights may be chosen with various goals in mind. For example, weights may be chosen to most closely fit the historical return of some fund or manager. Alternatively, the weights may be chosen for simplicity, such as having equal dollars invested in each asset class, with a given level of leverage. For example, to constrain leverage to 200% when the index has four equally weighted asset classes, weights of 0.5 would be applied to the returns of each asset class. Another goal for choosing weights may be to have equal dollar volatility in each asset class, for a given level of leverage. In a two-asset-class index, if asset class 1 has twice the volatility of asset class 2, and leverage is to be constrained to 150%, then the weight for asset class 1 would be 0.5, and the weight for asset class 2 would be 1.

Figure 2:
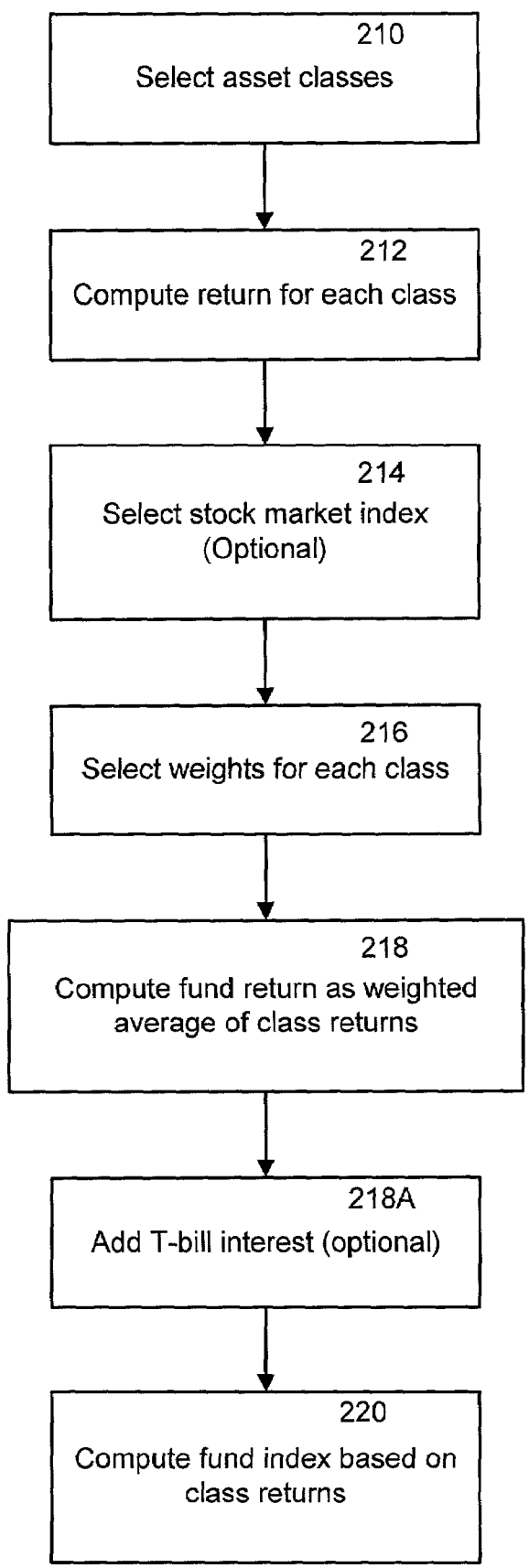
FIG. 2 is a flow chart showing the method of generating an index for any combination of asset classes, including those representative of hedge funds, according to the preferred embodiment.

Referring to FIG. 2, a hedge fund index may be generated as follows:

Step 210—Select asset classes, to be included in the index, and for each commercial asset class select representative members of the class and representative futures contracts for these members. Also select the holding period.

Step 212—Compute return for each commercial class, as described in steps 110 through 118.

Step 214—Optionally, select the stock market index to be used.

Step 216—Select weights for each class.

Step 218—Compute the fund return as the weighted average of class returns, applying equation (7).

Step 220—Compute the fund index based on the weighted class returns as follows:

$$MLMI(h+1,I)=MLMI(h,I)*(1+R(h+1,I)) \quad (8)$$

where MLMI(0,I)=1000.

Table V shows one such index constructed by applying the methodology of the preferred embodiment to the following asset classes: US stocks represented by the S&P 500 Index, and global bonds, currencies and commodities represented by indices produced by the methodology of the preferred embodiment. Following Sharpe, the weights in this example were chosen to minimize the squared differences between the monthly returns of the index and the returns of an index of hedge fund managers. The Index used for comparison in this example is the Hedge Fund Return ("HFR") Index, a broad index of the returns of hedge fund managers that is available commercially, but because it is just a compilation managers' actual returns, it cannot be traded in real time. The average holding period return for R(h,I) over the 5 year period is 1.29%, compared to 1.26% for the HFR Index.

Similarly, the MLM GMS™, a particular application of the preferred embodiment that has ben in commercial use for about six months, includes U.S. stocks represented by the S&P 500, foreign stocks represented by the DAX, CAC, FTSE, and the Nikkei 225, and global bonds, currencies, and commodities represented by sub indices calculated in the manner described above.

The present invention is described in connection with a preferred embodiment but is defined without limitation by the appended claims and includes insubstantial variations in elements and method steps.

TABLE I

| Holding Period (h) | Next to last Day | Market (m) | Contract Month (k) | Contract Year | PR (h, k, m) | PR (h-1, k, m) | CF (h, m) |
|---|---|---|---|---|---|---|---|
| | | | | | | | 1000 |
| Feb-97 | 2/27/97 | JY | March | 1997 | 0.8298 | 0.8275 | 1002.78 |
| Mar-97 | 3/27/97 | JY | June | 1997 | 0.8193 | 0.8405 | 977.49 |
| Apr-97 | 4/29/97 | JY | June | 1997 | 0.7937 | 0.8193 | 946.94 |
| May-97 | 5/29/97 | JY | June | 1997 | 0.8615 | 0.7937 | 1027.83 |
| Jun-97 | 6/27/97 | JY | September | 1997 | 0.8827 | 0.873 | 1039.25 |
| Jul-97 | 7/30/97 | JY | September | 1997 | 0.8493 | 0.8827 | 999.93 |
| Aug-97 | 8/28/97 | JY | September | 1997 | 8.8414 | 0.8493 | 990.63 |
| Sep-97 | 9/29/97 | JY | December | 1997 | 0.8353 | 0.8534 | 970.76 |
| Oct-97 | 10/30/97 | JY | December | 1997 | 0.836 | 0.8353 | 971.57 |
| Nov-97 | 11/26/97 | JY | December | 1997 | 0.7888 | 0.836 | 916.72 |
| Dec-97 | 12/30/97 | JY | March | 1998 | 0.7765 | 0.8002 | 889.56 |
| Jan-98 | 1/29/98 | JY | March | 1998 | 0.8011 | 0.7765 | 917.75 |
| Feb-98 | 2/26/98 | JY | March | 1998 | 0.7886 | 0.8011 | 903.43 |
| Mar-98 | 3/30/98 | JY | June | 1998 | 0.7654 | 0.7986 | 865.87 |
| Apr-98 | 4/29/98 | JY | June | 1998 | 0.7606 | 0.7654 | 860.44 |
| May-98 | 5/28/98 | JY | June | 1998 | 0.7221 | 0.7606 | 816.89 |
| Jun-98 | 6/29/98 | JY | September | 1998 | 0.7132 | 0.7316 | 796.34 |
| Jul-98 | 7/30/98 | JY | September | 1998 | 0.7001 | 0.7132 | 781.71 |
| Aug-98 | 8/28/98 | JY | September | 1998 | 0.7067 | 0.7001 | 789.08 |
| Sep-98 | 9/29/98 | JY | December | 1998 | 0.753 | 0.7159 | 829.97 |
| Oct-98 | 10/29/98 | JY | December | 1998 | 0.8603 | 0.753 | 948.24 |
| Nov-98 | 11/27/98 | JY | December | 1998 | 8.8141 | 0.8603 | 897.32 |
| Dec-98 | 12/30/98 | JY | March | 1999 | 0.8789 | 0.8248 | 956.18 |
| Jan-99 | 1/28/99 | JY | March | 1999 | 0.8639 | 0.8789 | 939.86 |
| Feb-99 | 2/25/99 | JY | March | 1999 | 0.8375 | 0.8639 | 911.14 |
| Mar-99 | 3/30/99 | JY | June | 1999 | 0.8396 | 0.8477 | 902.43 |

TABLE I-continued

| Holding Period (h) | Next to last Day | Market (m) | Contract Month (k) | Contract Year | PR (h, k, m) | PR (h-1, k, m) | CF (h, m) |
|---|---|---|---|---|---|---|---|
| Apr-99 | 4/29/99 | JY | June | 1999 | 0.8448 | 0.8396 | 908.02 |
| May-99 | 5/27/99 | JY | June | 1999 | 0.8324 | 0.8448 | 894.69 |
| Jun-99 | 6/29/99 | JY | September | 1999 | 0.8352 | 0.843 | 886.41 |
| Jul-99 | 7/29/99 | JY | September | 1999 | 0.8717 | 0.8352 | 925.15 |
| Aug-99 | 8/30/99 | JY | September | 1999 | 0.9053 | 0.8717 | 960.81 |
| Sep-99 | 9/29/99 | JY | December | 1999 | 0.9452 | 0.9177 | 989.60 |
| Oct-99 | 10/28/99 | JY | December | 1999 | 0.9576 | 0.9452 | 1002.59 |
| Nov-99 | 11/29/99 | JY | December | 1999 | 0.9802 | 0.9576 | 1026.25 |
| Dec-99 | 12/30/99 | JY | March | 2000 | 0.9864 | 0.9948 | 1017.58 |
| Jan-00 | 1/28/00 | JY | March | 2000 | 0.9405 | 0.9864 | 970.23 |
| Feb-00 | 2/28/00 | JY | March | 2000 | 0.9173 | 0.9405 | 946.30 |

TABLE II

| Holding Period (h) | Next to last Day | Market (m) | Contract Month (k) | Contract Year | PR (h, k, m) | PR (h-1, k, m) | CF (h, m) | MA (h, m) | PO (h, m) |
|---|---|---|---|---|---|---|---|---|---|
|  |  |  |  |  |  |  | 1000 |  |  |
| Feb-97 | 2/27/97 | JY | March | 1997 | 0.8298 | 0.8275 | 1002.78 |  |  |
| Mar-97 | 3/27/97 | JY | June | 1997 | 0.8193 | 0.8405 | 977.49 |  |  |
| Apr-97 | 4/29/97 | JY | June | 1997 | 0.7937 | 0.8193 | 946.94 |  |  |
| May-97 | 5/29/97 | JY | June | 1997 | 0.8615 | 0.7937 | 1027.83 |  |  |
| Jun-97 | 6/27/97 | JY | September | 1997 | 0.8827 | 0.873 | 1039.25 |  |  |
| Jul-97 | 7/30/97 | JY | September | 1997 | 0.8493 | 0.8827 | 999.93 |  |  |
| Aug-97 | 8/28/97 | JY | September | 1997 | 8.8414 | 0.8493 | 990.63 |  |  |
| Sep-97 | 9/29/97 | JY | December | 1997 | 0.8353 | 0.8524 | 970.76 |  |  |
| Oct-97 | 10/30/97 | JY | December | 1997 | 0.836 | 0.8353 | 971.57 |  |  |
| Nov-97 | 11/26/97 | JY | December | 1997 | 0.7888 | 0.836 | 916.72 |  |  |
| Dec-97 | 12/30/97 | JY | March | 1998 | 0.7765 | 0.8002 | 889.56 | 977.79 |  |
| Jan-98 | 1/29/98 | JY | March | 1998 | 0.8011 | 0.7765 | 917.75 | 970.93 | -1 |
| Feb-98 | 2/26/98 | JY | March | 1998 | 0.7886 | 0.8011 | 903.43 | 962.65 | -1 |
| Mar-98 | 3/30/98 | JY | June | 1998 | 0.7654 | 0.7986 | 865.87 | 953.35 | -1 |
| Apr-98 | 4/29/98 | JY | June | 1998 | 0.7606 | 0.7654 | 860.44 | 946.14 | -1 |
| May-98 | 5/28/98 | JY | June | 1998 | 0.7221 | 0.7606 | 816.89 | 928.57 | -1 |
| Jun-98 | 6/29/98 | JY | September | 1998 | 0.7132 | 0.7316 | 796.34 | 908.32 | -1 |
| Jul-98 | 7/30/98 | JY | September | 1998 | 0.7001 | 0.7132 | 781.71 | 890.14 | -1 |
| Aug-98 | 8/28/98 | JY | September | 1998 | 0.7067 | 0.7001 | 789.08 | 873.34 | -1 |
| Sep-98 | 9/29/98 | JY | December | 1998 | 0.753 | 0.7159 | 829.97 | 861.61 | -1 |
| Oct-98 | 10/29/98 | JY | December | 1998 | 0.8603 | 0.753 | 948.24 | 859.67 | -1 |
| Nov-98 | 11/27/98 | JY | December | 1998 | 8.8141 | 0.8603 | 897.32 | 858.05 | 1 |
| Dec-98 | 12/30/98 | JY | March | 1999 | 0.8789 | 0.8248 | 956.18 | 863.60 | 1 |
| Jan-99 | 1/28/99 | JY | March | 1999 | 0.8639 | 0.8789 | 939.86 | 865.44 | 1 |
| Feb-99 | 2/25/99 | JY | March | 1999 | 0.8375 | 0.8639 | 911.14 | 866.09 | 1 |
| Mar-99 | 3/30/99 | JY | June | 1999 | 0.8396 | 0.8477 | 902.43 | 869.13 | 1 |
| Apr-99 | 4/29/99 | JY | June | 1999 | 0.8448 | 0.8396 | 908.02 | 873.10 | 1 |
| May-99 | 5/27/99 | JY | June | 1999 | 0.8324 | 0.8448 | 894.69 | 879.58 | 1 |
| Jun-99 | 6/29/99 | JY | September | 1999 | 0.8352 | 0.843 | 886.41 | 887.09 | 1 |
| Jul-99 | 7/29/99 | JY | September | 1999 | 0.8717 | 0.8352 | 925.15 | 899.04 | -1 |
| Aug-99 | 8/30/99 | JY | September | 1999 | 0.9053 | 0.8717 | 960.81 | 913.35 | 1 |
| Sep-99 | 9/29/99 | JY | December | 1999 | 0.9452 | 0.9177 | 989.60 | 926.66 | 1 |
| Oct-99 | 10/28/99 | JY | December | 1999 | 0.9576 | 0.9452 | 1002.59 | 931.18 | 1 |
| Nov-99 | 11/29/99 | JY | December | 1999 | 0.9802 | 0.9576 | 1026.25 | 941.93 | 1 |
| Dec-99 | 12/30/99 | JY | March | 2000 | 0.9864 | 0.9948 | 1017.58 | 947.05 | 1 |
| Jan-00 | 1/28/00 | JY | March | 2000 | 0.9405 | 0.9864 | 970.23 | 949.58 | 1 |
| Feb-00 | 2/28/00 | JY | March | 2000 | 0.9173 | 0.9405 | 946.30 | 952.51 | 1 |
| Mar-00 |  |  |  |  |  |  |  |  | -1 |

TABLE III

| Holding Period (h) | Last day of holding period | Market (m) | Contract Month (k) | Contract Year | PL (h, m) | PL (h-1, m) | PO (h, m) | R (h, m) |
|---|---|---|---|---|---|---|---|---|
| Jan-98 | 1/30/98 | JY | March | 1998 | 0.7915 | 0.7736 | -1 | -2.31% |
| Feb-98 | 2/27/98 | JY | March | 1998 | 0.7948 | 0.7915 | -1 | -0.42% |
| Mar-98 | 3/31/98 | JY | June | 1998 | 0.7587 | 0.805 | -1 | 5.75% |
| Apr-98 | 4/30/98 | JY | June | 1998 | 0.7567 | 0.7587 | -1 | 0.26% |
| May-98 | 5/29/98 | JY | June | 1998 | 0.7222 | 0.7567 | -1 | 4.56% |
| Jun-98 | 6/30/98 | JY | September | 1998 | 0.7266 | 0.7317 | -1 | 0.70% |
| Jul-98 | 7/31/98 | JY | September | 1998 | 0.6954 | 0.7266 | -1 | 4.29% |
| Aug-98 | 8/31/98 | JY | September | 1998 | 0.7107 | 0.6954 | -1 | -2.20% |

TABLE III-continued

| Holding Period (h) | Last day of holding period | Market (m) | Contract Month (k) | Contract Year | PL (h, m) | PL (h-1, m) | PO (h, m) | R (h, m) |
|---|---|---|---|---|---|---|---|---|
| Sep-98 | 9/30/98 | JY | December | 1998 | 0.739 | 0.72 | −1 | −2.64% |
| Oct-98 | 10/30/98 | JY | December | 1998 | 0.8671 | 0.739 | −1 | −17.33% |
| Nov-98 | 11/30/98 | JY | December | 1998 | 0.8134 | 0.8671 | 1 | −6.19% |
| Dec-98 | 12/31/98 | JY | March | 1999 | 0.8884 | 0.8241 | 1 | 7.80% |
| Jan-99 | 1/29/99 | JY | March | 1999 | 0.8637 | 0.8884 | 1 | −2.78% |
| Feb-99 | 2/26/99 | JY | March | 1999 | 0.8416 | 0.8637 | 1 | −2.56% |
| Mar-99 | 3/31/99 | JY | June | 1999 | 0.8486 | 0.8519 | 1 | −0.39% |
| Apr-99 | 4/30/99 | JY | June | 1999 | 0.842 | 0.8486 | 1 | −0.78% |
| May-99 | 5/28/99 | JY | June | 1999 | 0.825 | 0.842 | 1 | −2.02% |
| Jun-99 | 6/30/99 | JY | September | 1999 | 0.8348 | 0.8356 | 1 | −0.10% |
| Jul-99 | 7/30/99 | JY | September | 1999 | 0.8787 | 0.8348 | −1 | −5.26% |
| Aug-99 | 8/31/99 | JY | September | 1999 | 0.9147 | 0.8787 | 1 | 4.10% |
| Sep-99 | 9/30/99 | JY | December | 1999 | 0.95 | 0.9273 | 1 | 2.45% |
| Oct-99 | 10/29/99 | JY | December | 1999 | 0.9659 | 0.95 | 1 | 1.67% |
| Nov-99 | 11/30/99 | JY | December | 1999 | 0.9833 | 0.9659 | 1 | 1.80% |
| Dec-99 | 12/31/99 | JY | March | 2000 | 0.9892 | 0.9979 | 1 | −0.87% |
| Jan-00 | 1/31/00 | JY | March | 2000 | 0.9368 | 0.9892 | 1 | −5.30% |
| Feb-00 | 2/29/00 | JY | March | 2000 | 0.91 | 0.9368 | 1 | −2.86% |
| Mar-00 |  |  |  |  |  |  | −1 |  |

TABLE IV

| Holding Period | Market Returns | | | | | | | Currency Class Return | MLMI (h, C) |
|---|---|---|---|---|---|---|---|---|---|
|  | DA | BP | CA | DM | EU | JY | SF |  |  |
|  |  |  |  |  |  |  |  |  | 1000 |
| Jan-98 | −5.43% | −1.08% | 1.90% | 1.88% | na | −2.31% | 1.28% | −0.63% | 993.71 |
| Feb-98 | 1.08% | 0.92% | −2.25% | −0.64% | na | −0.42% | −0.50% | −0.30% | 990.71 |
| Mar-98 | 2.60% | 1.78% | −0.28% | 1.95% | na | 5.75% | 4.39% | 2.70% | 1017.45 |
| Apr-98 | 1.97% | 0.19% | 0.92% | −2.71% | na | 0.26% | −1.15% | −0.08% | 1016.60 |
| May-98 | 4.11% | −2.31% | 1.83% | −0.43% | na | 4.56% | −0.90% | 1.14% | 1028.21 |
| Jun-98 | 0.94% | −2.30% | 0.83% | 1.42% | na | 0.70% | 2.83% | 0.74% | 1035.78 |
| Jul-98 | 2.00% | −1.97% | 2.98% | −1.49% | na | 4.29% | −1.67% | 0.69% | 1042.91 |
| Aug-98 | 5.79% | −3.06% | 3.90% | −1.03% | na | −2.20% | −3.00% | 0.07% | 1043.60 |
| Sep-98 | −4.24% | 1.34% | −2.88% | 5.03% | na | −2.64% | 4.22% | 0.14% | 1045.06 |
| Oct-98 | −4.90% | −1.31% | 0.90% | 0.72% | na | −17.33% | 1.75% | −3.36% | 1009.91 |
| Nov-98 | −0.43% | −1.40% | −0.65% | −2.48% | na | −6.19% | −3.52% | −2.45% | 985.21 |
| Dec-98 | −3.14% | 0.95% | 0.08% | 1.50% | na | 7.80% | 1.30% | 1.42% | 999.16 |
| Jan-99 | −3.58% | −0.71% | −1.53% | −3.24% | na | −2.78% | −3.11% | −2.49% | 974.25 |
| Feb-99 | −1.94% | −2.66% | −0.02% | −3.19% | na | −2.56% | −2.55% | −2.15% | 953.28 |
| Mar-99 | 2.73% | −0.66% | −0.11% | 2.52% | na | −0.39% | 2.79% | 1.15% | 964.23 |
| Apr-99 | 4.19% | 0.14% | −3.45% | 1.76% | na | −0.78% | 2.84% | 0.78% | 971.76 |
| May-99 | −1.50% | 0.47% | −1.06% | 1.90% | na | −2.02% | 0.80% | −0.23% | 969.49 |
| Jun-99 | 2.10% | 1.34% | 0.60% | 0.71% | na | −0.10% | 1.56% | 1.04% | 979.53 |
| Jul-99 | −2.13% | −2.75% | −2.65% | −3.25% | na | −5.26% | −3.63% | −3.28% | 947.42 |
| Aug-99 | −1.81% | 0.97% | 0.71% | 0.00% | na | 4.10% | 1.87% | 0.97% | 956.63 |
| Sep-99 | 1.93% | −2.38% | 1.74% | 0.00% | na | 2.45% | −0.60% | 0.53% | 961.66 |
| Oct-99 | −2.54% | −0.10% | −0.31% | 0.00% | na | 1.67% | 1.92% | 0.11% | 962.69 |
| Nov-99 | −0.03% | −2.78% | −0.22% | 0.00% | na | 1.80% | 4.54% | 0.55% | 968.00 |
| Dec-99 | −3.23% | −1.20% | 1.70% | 0.00% | na | −0.87% | 0.36% | −0.54% | 962.78 |
| Jan-00 | −3.51% | −0.21% | −0.12% | na | 4.28% | −5.30% | 4.58% | −0.04% | 962.35 |
| Feb-00 | 2.57% | −2.24% | −0.26% | na | 0.54% | −2.86% | 0.48% | −0.30% | 959.51 |

TABLE V

| | Asset Classes | | | | Returns | | | |
|---|---|---|---|---|---|---|---|---|
| Weights | 1.030 | 0.205 | 0.117 | 0.468 | | Leverage | | |
| Holding | Global | | | US | | 182.05% | Indexes | |
| Period | Bonds | Currency | Commodity | Stocks | R (h, I) | HFR | MLMI | HFR |
|  |  |  |  |  |  |  | 1000 | 1000 |
| Jan-1995 | −1.22% | 0.31% | 1.50% | 2.35% | 0.08% | −0.87% | 1000.8426 | 991.3 |
| Feb-1995 | −0.38% | 1.26% | −0.29% | 3.46% | 1.45% | 1.45% | 1015.3633 | 1005.6739 |
| Mar-1995 | 1.15% | 4.86% | −3.93% | 2.41% | 2.84% | 1.40% | 1044.2332 | 1019.7533 |
| Apr-1995 | 1.09% | −0.43% | 0.69% | 2.45% | 2.27% | 1.78% | 1067.8974 | 1027.7074 |

TABLE V-continued

| | Asset Classes | | | | Returns | | | |
|---|---|---|---|---|---|---|---|---|
| Weights | 1.030 | 0.205 | 0.117 | 0.468 | | Leverage | | |
| Holding | Global | | | US | | 182.05% | Indexes | |
| Period | Bonds | Currency | Commodity | Stocks | R (h, I) | HFR | MLMI | HFR |
| May-1995 | 3.46% | −0.92% | 0.73% | 3.21% | 4.97% | 2.54% | 1120.9221 | 1053.8111 |
| Jun-1995 | −1.10% | 0.60% | 3.07% | 1.72% | 0.16% | 0.47% | 1122.7441 | 1058.764 |
| Jul-1995 | 0.58% | −1.35% | −1.22% | 2.92% | 1.55% | 3.93% | 1140.1206 | 1100.3735 |
| Aug-1995 | 1.34% | −3.20% | 0.10% | −0.05% | −0.32% | 5.59% | 1136.4766 | 1161.8843 |
| Sep-1995 | 0.81% | −0.77% | 3.54% | 3.66% | 2.80% | 3.22% | 1168.3165 | 1199.297 |
| Oct-1995 | 1.15% | 1.01% | 0.15% | −0.74% | 1.06% | 0.41% | 1180.7199 | 1204.2141 |
| Nov-1995 | 2.08% | −1.10% | −0.39% | 4.01% | 3.74% | 3.63% | 1224.9074 | 1247.9271 |
| Dec-1995 | 0.65% | 0.17% | 2.62% | 0.93% | 1.45% | 3.63% | 1242.6406 | 1293.2269 |
| Jan-1996 | 0.55% | 0.79% | −1.75% | 3.15% | 2.00% | 5.28% | 1267.5312 | 1361.5092 |
| Feb-1996 | −2.45% | −0.31% | 1.50% | 0.05% | −2.39% | −3.77% | 1237.2042 | 1310.1803 |
| Mar-1996 | −0.27% | 0.62% | 2.37% | 1.09% | 0.64% | 0.37% | 1245.0615 | 1315.028 |
| Apr-1996 | 0.40% | 1.39% | 1.38% | 0.55% | 1.12% | 3.11% | 1258.9734 | 1355.9254 |
| May-1996 | −0.42% | 0.31% | −1.39% | 1.85% | 0.33% | −0.08% | 1263.1677 | 1354.8406 |
| Jun-1996 | −0.48% | 0.08% | 3.40% | 0.60% | 0.20% | −1.06% | 1265.6904 | 1340.4793 |
| Jul-1996 | 0.03% | −2.02% | −2.99% | −5.08% | −3.12% | −3.04% | 1226.2263 | 1299.7288 |
| Aug-1996 | 0.79% | 1.03% | 1.31% | 1.39% | 1.83% | 0.73% | 1248.7226 | 1309.2168 |
| Sep-1996 | 1.35% | 1.70% | 1.74% | 5.20% | 4.38% | 2.01% | 1303.3726 | 1335.532 |
| Oct-1996 | 0.70% | 1.66% | −1.10% | 2.64% | 2.17% | 1.58% | 1331.6528 | 1356.6334 |
| Nov-1996 | 2.08% | 1.66% | 0.09% | 6.85% | 5.70% | 4.72% | 1407.6115 | 1420.6665 |
| Dec-1996 | −1.15% | 0.56% | 2.43% | −2.72% | −2.06% | −0.49% | 1378.6015 | 1413.7053 |
| Jan-1997 | 0.98% | 0.87% | −0.56% | 5.78% | 3.83% | 5.14% | 1431.4283 | 1486.3697 |
| Feb-1997 | 0.77% | 0.76% | −2.51% | 0.37% | 0.82% | 1.59% | 1443.1894 | 1510.003 |
| Mar-1997 | −1.67% | 0.35% | 1.70% | −5.00% | −3.79% | −1.24% | 1388.4266 | 1491.279 |
| Apr-1997 | 0.24% | 1.50% | 2.13% | 5.91% | 3.58% | −0.22% | 1438.0788 | 1487.9982 |
| May-1997 | −0.01% | −1.91% | 3.11% | 5.95% | 2.76% | 1.83% | 1477.704 | 1515.2285 |
| Jun-1997 | 1.03% | 1.33% | −2.88% | 3.60% | 2.69% | 1.82% | 1517.3842 | 1542.8057 |
| Jul-1997 | 1.78% | 2.15% | −0.12% | 7.60% | 5.82% | 5.90% | 1605.7186 | 1633.8312 |
| Aug-1997 | −0.69% | 0.23% | 0.90% | −5.73% | −3.24% | −1.25% | 1553.619 | 1613.4083 |
| Sep-1997 | 2.04% | −0.72% | −2.75% | 4.57% | 3.77% | 3.05% | 1612.1464 | 1662.6173 |
| Oct-1997 | 0.32% | −0.47% | 0.51% | −3.20% | −1.20% | −1.60% | 1592.7203 | 1636.0154 |
| Nov-1997 | 0.53% | 1.90% | −0.73% | 3.34% | 2.42% | −0.25% | 1641.2073 | 1631.9254 |
| Dec-1997 | 0.91% | 1.79% | 1.83% | 1.43% | 2.19% | 2.93% | 1666.9956 | 1679.7408 |
| | | | | | | | 1000 | 1000 |
| Jan-1998 | 1.37% | −0.63% | −0.28% | 0.89% | 1.67% | 0.20% | 1694.8042 | 1683.1003 |
| Feb-1998 | 0.22% | −0.30% | 4.06% | 6.35% | 3.61% | 1.90% | 1756.0489 | 1715.0792 |
| Mar-1998 | 0.43% | 2.70% | 0.88% | 4.59% | 3.25% | 5.05% | 1813.1435 | 1801.6907 |
| Apr-1998 | 0.09% | −0.08% | 1.51% | 0.78% | 0.62% | −0.13% | 1824.3857 | 1799.3485 |
| May-1998 | 1.05% | 1.14% | 0.62% | −2.54% | 0.20% | 0.08% | 1827.9934 | 1800.7879 |
| Jun-1998 | 0.08% | 0.74% | −0.13% | 3.65% | 1.93% | 0.57% | 1863.3577 | 1811.0524 |
| Jul-1998 | 0.48% | 0.69% | 1.19% | −1.75% | −0.04% | 0.23% | 1862.5305 | 1815.2179 |
| Aug-1998 | 2.94% | 0.07% | 7.06% | −15.05% | −3.18% | −3.70% | 1803.326 | 1748.0548 |
| Sep-1998 | 2.69% | 0.14% | −5.79% | 6.45% | 5.14% | −0.50% | 1896.0963 | 1739.3145 |
| Oct-1998 | −1.14% | −3.36% | 0.95% | 7.72% | 1.87% | −1.83% | 1931.4688 | 1707.4851 |
| Nov-1998 | 0.67% | −2.45% | 4.07% | 5.18% | 3.09% | 1.98% | 1991.2077 | 1741.2933 |
| Dec-1998 | −0.49% | 1.42% | 2.09% | 6.08% | 2.87% | 2.44% | 2048.4359 | 1783.7808 |
| Jan-1999 | 0.66% | −2.49% | 2.73% | 2.89% | 1.85% | 0.81% | 2086.2349 | 1798.2294 |
| Feb-1999 | −2.78% | −2.15% | 5.23% | −3.59% | −4.37% | −1.24% | 1995.0637 | 1775.9314 |
| Mar-1999 | −0.12% | 1.15% | −10.63% | 3.67% | 0.58% | 1.07% | 2006.7298 | 1794.9339 |
| Apr-1999 | 0.59% | 0.78% | 1.23% | 3.34% | 2.48% | 3.86% | 2056.4838 | 1864.2183 |
| May-1999 | −0.43% | −0.23% | −1.71% | −2.94% | −2.07% | −0.90% | 2013.9812 | 1847.4403 |
| Jun-1999 | −1.49% | 1.04% | −2.04% | 5.47% | 1.00% | 2.16% | 2034.0273 | 1887.3451 |
| Jul-1999 | 1.11% | −3.28% | 3.86% | −3.61% | −0.77% | 0.46% | 2018.4081 | 1896.0268 |
| Aug-1999 | 0.08% | 0.97% | −0.76% | −0.90% | −0.23% | −0.55% | 2013.7325 | 1885.5987 |
| Sep-1999 | 0.41% | 0.53% | 0.72% | −2.76% | −0.68% | 1.08% | 2000.1236 | 1905.9632 |
| Oct-1999 | −0.34% | 0.11% | −2.72% | 6.01% | 2.16% | −0.85% | 2043.371 | 1889.7625 |
| Nov-1999 | −0.41% | 0.55% | −1.75% | 1.11% | 0.01% | 3.59% | 2043.5886 | 1957.605 |
| Dec-1999 | 1.66% | −0.54% | 0.68% | 5.30% | 4.16% | 6.66% | 2128.6503 | 2087.9814 |

What is claimed is:

1. A method for generating an index of fundamental investment returns in asset classes that comprise the index, including commercial asset classes, comprising the steps of:
   (a) selecting a representative set of assets, where each said asset is grouped into a respective one of a plurality of asset classes;
   (b) for any time t including the present time, time t being at the close of a holding period h, generating a rule based on market prices at a plurality of times preceding time t to determine a position for each of said assets for a succeeding holding period h+1;
   (c) computing the position for each of said assets for said succeeding holding period h+1 in accordance with said rule, wherein the position indicates whether each particular asset is long or short;
   (d) obtaining market prices for each of said assets at the beginning and end of said succeeding holding period h+1;

(e) computing with the computer a return for each of said assets for said succeeding holding period h+1, said return being a function of the position for said succeeding holding period h+1 and the market prices at the beginning and end of said succeeding holding period h+1 determined in steps (c) and (d);

(f) averaging the returns computed in step (e) for all the selected assets in each of said plurality of asset classes, the average for each of said asset classes is the return for that asset class; and (g) computing and outputting with the computer the index by combining the returns for each asset class.

2. The method of claim 1, where the step (g) of computing the index further comprises the steps of selecting weights such that each weight corresponds to one of said plurality of asset classes, and averaging the products of the return for each asset class multiplied by its corresponding weight.

3. A method for generating a series of investment returns with respect to time, the method comprising the steps of:

(a) selecting a plurality of assets from a plurality of asset classes;

(b) computing a position for each of said assets for a time t based on historical market price data, wherein the position indicates whether each particular asset is long or short;

(c) selecting a holding period beginning at time t for each of said assets;

(d) obtaining a market price for each of said assets at time t and at the end of said holding period;

(e) computing with a computer an asset return for each of said assets for said holding period, said asset return being a function of the position and the market price of each of said assets at time t and at the end of said holding period;

(f) averaging said asset returns computed in step (e) for said holding period, for all of said assets in each of said asset classes;

(g) computing a class return for each of said asset classes based on said averaging; and (h) computing and outputting with the computer an index of returns for said holding period, by combining the class returns for each of said asset classes for said holding period.

4. The method of claim 3, wherein the step of computing the index of investment returns further comprises the steps of selecting weights such that each weight corresponds to one of said asset classes, and averaging the products of the class return for each asset class multiplied by the corresponding weight.

5. The method of claim 3, further comprising selecting an asset from each of two commercial markets.

6. The method of claim 3, wherein said plurality of asset classes comprises are selected from the group of: commodities, currencies, and bonds.

7. The method of claim 3, further comprising computing said position based on whether the market price for each of said assets increased or decreased since a predefined time preceding said time t.

8. The method of claim 3, further comprising computing said position based on a moving average of the asset returns for each of said assets for a predetermined past time period.

9. The method of claim 3, further comprising the steps of:

(a) computing a continuous series of returns for each of said assets, wherein a return is determined using a futures contract for each of said assets for each of a plurality of holding periods;

(b) computing an average value of the continuous series over a predetermined number of past holding periods; and (c) computing said position as a function of the current value of the continuous series and said average value of the continuous series.

10. The method of claim 9, further comprising the steps of setting the position to long when the current value of said continuous series of futures returns is greater than the average value of the continuous series, and otherwise setting the position to short.

11. The method of claim 3, further comprising the steps of determining one or more futures contracts for each of said assets and determining the market prices for each of said assets for said times t in accordance with the futures contract for said times t.

12. The method of claim 3, wherein said step of computing the asset return for each of said assets further comprises the step of setting the asset return equal to the product of the market price at said time t divided by the market price at a preceding time t−1 multiplied by the position for said time t.

13. The method of claim 3, further comprising the steps of computing the investment return for the holding period beginning at time t as the average of the class returns for said holding period, and computing an index for said holding period as the product of the index for the preceding said holding period multiplied by the sum of one plus the investment return for the holding period beginning at time t.

14. A method for generating a series of investment returns for a plurality of asset classes that comprise an index, each class having at least one asset member, the method comprising the steps of:

(a) selecting a plurality of holding periods;

(b) selecting a futures contract for each asset member, each futures contract having a market price at the beginning and end of each of said holding periods;

(c) calculating a continuous series of futures returns for each asset member based on the futures contract and the market price for said asset member at the beginning and end of each of said holding periods;

(d) computing a position for each said asset member for each of said holding periods based on said continuous series of futures returns for the preceding holding periods, wherein the position indicates whether each particular asset is long or short;

(e) calculating an asset return for each said asset member based on the position and the market price at the beginning and end of said holding period;

(f) calculating a class return for each asset class based on the market returns for each asset member in said class; and (g) calculating and outputting an investment return for said holding period, by combining the class returns among the asset classes of the index.

15. The method of claim 14, wherein said plurality of asset classes comprises at least one from the group of: commodities, currencies, and bonds.

16. A method for generating a series of investment returns for a plurality of asset classes that comprise an index, each class having at least one asset member, the method comprising the steps of:

(a) selecting a holding period for each said asset member;

(b) selecting a futures contract for each asset member, each said futures contract having a market price for the beginning and end of each said holding period;

(c) computing a position for each said asset member based on the futures contract, the market prices and the holding period, wherein the position indicates whether each particular asset is long or short;

(d) computing an asset return for each said asset member as a function of the position for each said holding period and the prices at the beginning and end of each said holding period;

(e) computing a class return for each asset class as an average of the asset return for each said asset class member;

(f) computing a weight corresponding to each said asset class;

(g) computing a weighted return for each said asset class as a product of the class return for each said asset class and the corresponding weight; and (h) computing and outputting an investment return for said holding period as a sum of the weighted return for each said asset class among the asset classes of the index.

17. The method of claim 16, wherein said plurality of asset classes comprises at least one from the group of commodities, currencies, and bonds.

18. An apparatus for generating an index of investment returns, comprising a processor; and a memory storing processing instructions for controlling the processor, the processor being configured with the processing instructions to:

(a) select a plurality of assets from a plurality of asset classes;

(b) compute a position for each of said assets for a time t based on historical market price data, wherein the position indicates whether each particular asset is long or short;

(c) select a holding period beginning at time t for each of said assets;

(d) obtain a market price for each of said assets at time t and at the end of said holding period;

(e) compute with a computer an asset return for each of said assets for said holding period, said asset return being a function of the position and the market price at time t and at the end of said holding period;

(f) average said asset returns computed in step (e) for said holding period, for all of said assets in each of said asset classes;

(g) compute a class return for each of said asset classes based on said averaging; and (h) compute and output with the computer an index of investment returns for said holding period by combining the class returns for each of said asset classes for said holding period.

19. The apparatus of claim 18, wherein computing the index of investment returns further comprises selecting weights such that each weight corresponds to one of said asset classes, and averaging the products of the class return for each asset class multiplied by the corresponding weight.

20. An apparatus for generating an index of investment returns for a plurality of asset classes that comprise the index, each class having at least one asset member, comprising a processor; and a memory storing processing instructions for controlling the processor, the processor being configured with the processing instructions to: (a) select a plurality of holding periods; (b) select a futures contract for each asset member, each futures contract having a market price at the beginning and end of each of said holding periods; (c) calculate a continuous series of returns for each asset member based on the futures contract and the market price for said asset member at the beginning and end of each of said holding periods; (d) compute a position for each said asset member for each of said holding periods based on said continuous series of futures returns for the preceding holding periods, wherein the position indicates whether each particular asset is long or short; (e) calculate an asset return for each said asset member based on the position and market price of each of said assets at the beginning and end of said holding period; (f) calculate a class return for each asset class based on the market returns for each asset member in said class; and (g) calculate and output an investment return for said holding period by combining the class returns for each of said assets among the asset classes of the index for said holding period.

21. An apparatus for generating an index of investment returns for a plurality of asset classes that comprise the index, each class having at least one asset member, comprising a processor; and a memory storing processing instructions for controlling the processor, the processor being configured with the processing instructions to: (a) select a holding period for each said asset member; (b) select a futures contract for each asset member, each said futures contract having a market price at the beginning and end of each said holding period; (c) compute a position for each said asset class member based on the futures contract, the market prices and the holding period, wherein the position indicates whether each particular asset is long or short; (d) compute an asset return for each said asset member as a function of the position for each said holding period and the prices at the beginning and end of said holding period; (e) compute a class return for each asset class for each said holding period as an average of the asset return for each said asset member for each said holding period; (f) compute a weight corresponding to each said asset class; (g) compute a weighted return for each said asset class as a product of the class return for each said asset class and the corresponding weight; and (h) compute and output an investment return for said holding period as a sum of the weighted return for each said asset class among the asset classes of the index.

22. A computer-readable storage medium encoded with processing instructions executable by a computer for implementing a method for generating an index of investment returns for a plurality of asset classes that comprise the index, each class having at least one asset member, the processing instructions, when executed in the computer, comprising: (a) selecting a plurality of holding periods; (b) selecting a futures contract for each asset member, each futures contract having a market price at the beginning and end of each of said holding periods; (c) calculating a continuous series of futures returns for each asset member based on the futures contract and the market price for said asset member for each of said holding periods; (d) computing a position for each said asset member for each of said holding periods based on said continuous series of futures returns for the preceding holding periods, wherein the position indicates whether each particular asset is long or short; (e) calculating an asset return for each said asset member for each said holding period based on the position and the market prices at the beginning and end of said holding period; (f) calculating a class return for each asset class for each said holding period based on the market returns for each asset member in said class; and (g) calculating and outputting an investment return for said holding period by combining the class returns among the asset classes of the index.

23. A computer-readable storage medium encoded with processing instructions executable by a computer for implementing a method for generating an index of investment returns for a plurality of asset classes that comprise the index, each class having at least one asset member, the processing instructions, when executed in the computer, comprising: (a) selecting a holding period for each said asset member; (b) selecting a futures contract for each asset member, each said futures contract having a market price at the beginning and end of each said holding period; (c) computing a position for each said asset member based on the futures contract, the market price and the holding period, wherein the position indicates whether each particular asset is long or short; (d) computing an asset return for each said asset member for each said holding period as a function of the position for said holding period and the market prices at the beginning and end of said holding period; (e) computing a class return for each asset class for each said holding period as an average of the asset return for each said asset member for each said holding periods; (f) computing a weight corresponding to each said asset class; (g) computing a weighted return for each said asset class for each said holding period as a product of the class return for each said asset class and the corresponding weight; and (h) computing and outputting an investment return for each said holding period as a sum of the weighted return for each said asset class among the asset classes of the index.

* * * * *